(12) United States Patent
Lesnik

(10) Patent No.: US 8,517,416 B2
(45) Date of Patent: Aug. 27, 2013

(54) AIRBAG COVER, IN PARTICULAR FOR AN AIRBAG IN A MOTOR VEHICLE AND A METHOD FOR THE MANUFACTURE THEREOF

(75) Inventor: Siegfried Lesnik, Tonisvorst (DE)

(73) Assignee: International Automotive Components Group GmbH, Krefeld (DE)

( * ) Notice: Subject to any disclaimer, the term of this patent is extended or adjusted under 35 U.S.C. 154(b) by 0 days.

(21) Appl. No.: 13/349,411

(22) Filed: Jan. 12, 2012

(65) Prior Publication Data

US 2012/0299273 A1 Nov. 29, 2012

(30) Foreign Application Priority Data

May 26, 2011 (EP) .................................. 11167663

(51) Int. Cl.
*B60R 21/20* (2006.01)

(52) U.S. Cl.
USPC ..................................................... 280/728.3

(58) Field of Classification Search
USPC .............................. 280/728.3, 732
See application file for complete search history.

(56) References Cited

U.S. PATENT DOCUMENTS

| | | | |
|---|---|---|---|
| 5,375,875 A | 12/1994 | DiSalvo et al. | |
| 5,466,000 A | 11/1995 | Leonard et al. | |
| 5,698,283 A * | 12/1997 | Yamasaki et al. | ............... 428/43 |
| 5,839,752 A * | 11/1998 | Yamasaki et al. | .......... 280/728.3 |
| 5,979,931 A * | 11/1999 | Totani et al. | ............... 280/728.3 |
| 6,224,090 B1 * | 5/2001 | Lutze et al. | ............... 280/728.3 |
| 6,440,514 B1 * | 8/2002 | Ueno et al. | ....................... 428/43 |
| 6,942,243 B2 | 9/2005 | Davis, Jr. et al. | |
| 7,014,209 B2 * | 3/2006 | Muller et al. | ............... 280/728.3 |
| 7,156,415 B2 * | 1/2007 | Gray et al. | ................... 280/728.3 |
| 7,992,890 B2 | 8/2011 | Nogaret et al. | |
| 2002/0003343 A1 | 1/2002 | Kansteiner | |

FOREIGN PATENT DOCUMENTS

| | | |
|---|---|---|
| DE | 197 38 493 A1 | 3/1998 |
| DE | 298 11 739 U1 | 8/1998 |
| DE | 195 16 230 C2 | 4/1999 |
| DE | 100 32 104 A1 | 1/2002 |
| DE | 102 53 185 A1 | 6/2004 |
| DE | 103 44 401 A1 | 5/2005 |
| DE | 10 2006 008 564 A1 | 8/2007 |
| DE | 10 2006 054 590 B3 | 1/2008 |
| EP | 0 428 935 B1 | 9/1995 |
| EP | 0 741 062 B1 | 7/2000 |
| EP | 2 233 372 A1 | 9/2010 |

* cited by examiner

*Primary Examiner* — Faye M. Fleming
(74) *Attorney, Agent, or Firm* — Grossman, Tucker, Perreault & Pfleger, PLLC

(57) ABSTRACT

An airbag cover with a support component and a top-cover component, wherein the support component and the top-cover component are covered up with a covering material. A predetermined breakage line is formed between the support component and the top-cover component, which defines at least one serration or one undulation at the edge of the top-cover component, and the covering material exhibits a structural weakening, wherein the contour of the structural weakening is congruent with the contour of the breakage line at least in the area of the serration or the undulation. The breakage line between the support component and the top-cover component and the structural weakening of the covering material are formed at least in the area of the serration or the undulation by means of one or a plurality of cuts, which fully penetrate the support component and partially penetrate the covering material.

14 Claims, 5 Drawing Sheets

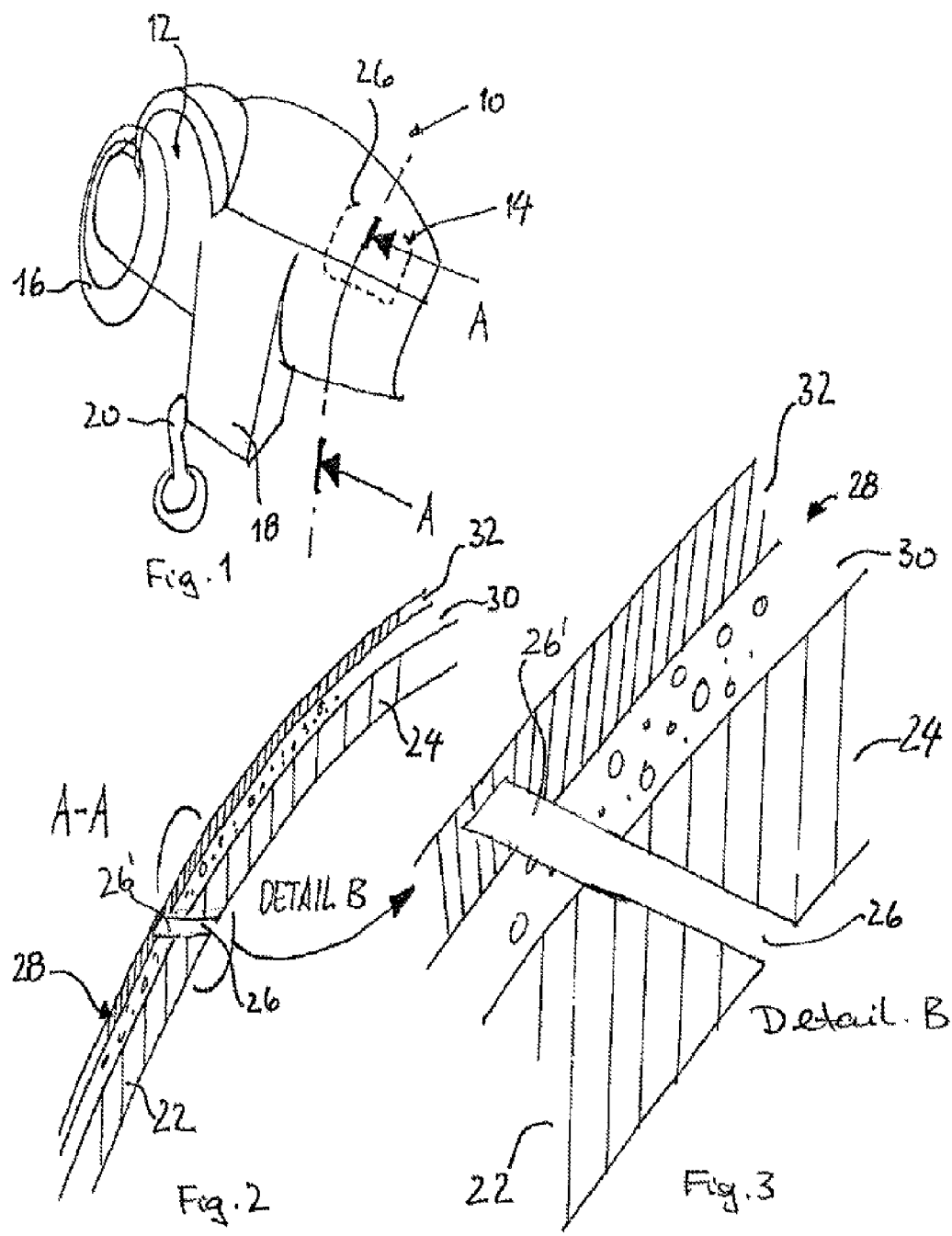

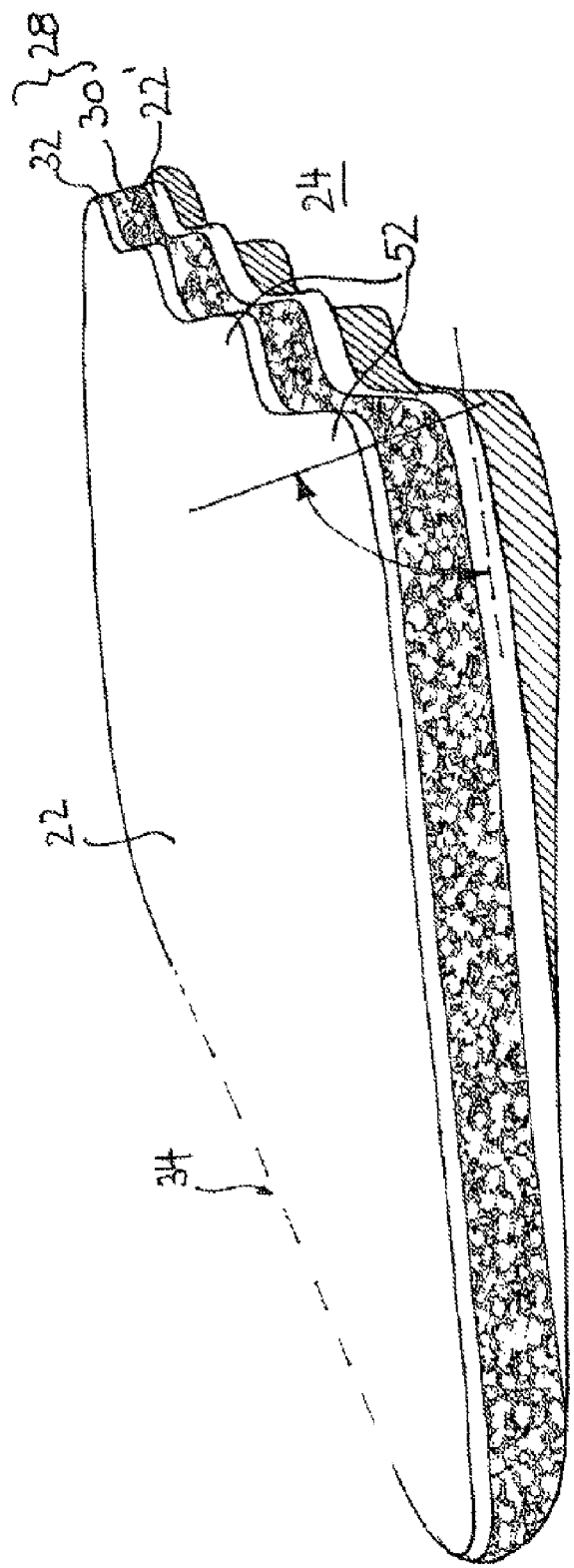
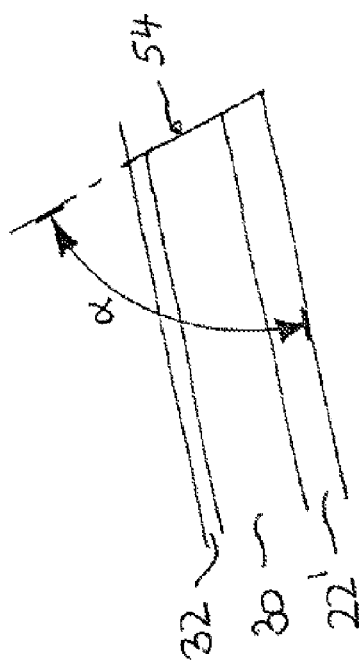
Fig. 4

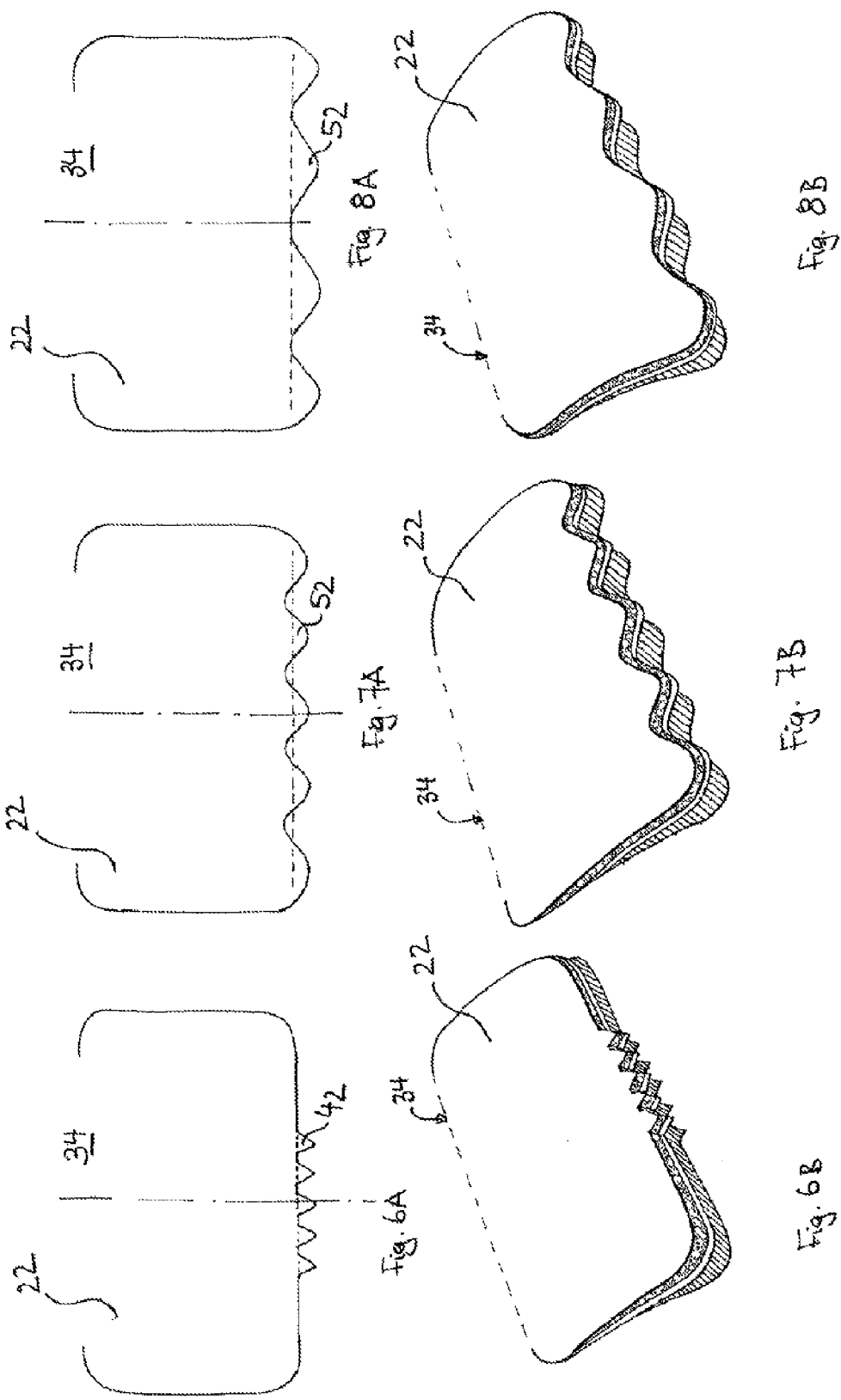

AIRBAG COVER, IN PARTICULAR FOR AN AIRBAG IN A MOTOR VEHICLE AND A METHOD FOR THE MANUFACTURE THEREOF

The invention concerns an airbag cover for an airbag in a motor vehicle according to the general terms of patent claim 1, as well as a method for the manufacture thereof. Such an airbag cover is, for example, known from EP patent 2 233 372 A1.

The invention can be used in airbag arrangements, which are used, for instance, as front- or side-impact protection in a motor vehicle. Such airbag arrangements exhibit an airbag impact-cushion and related operating equipment that are placed in a receptacle of a support component, for instance in the instrument panel of a vehicle. The receptacle is covered with a top cover that can be manufactured together with the support component as a shaped part. The top cover and the support component are connected to one another, for example on an instrument-panel support, wherein predetermined breakage points are designed between the top cover and the support component. Upon the triggering of the airbag, the connection of support component and top cover breaks in the area of the breakage points, so that the top cover is at least partially loosened from the support component and the receptacle is opened.

Such airbag arrangements are, for example, on the steering wheel of a vehicle and are built into the instrument panel on the passenger side. It is also known for airbag equipment to be built into the doors as side-impact protection. Airbag arrangements are covered by means of a top cover of plastic or metal parts covered with foam, which are generally indicated here as a shaped part, in which these top covers are provided with predetermined breakage points, which break off upon airbag triggering and ensure a perfect deployment of the impact cushions that lie below the top cover. The predetermined breakage points should be sized so that a specified tear behavior of the top cover is attained at a predetermined tearing force.

Furthermore, it is customary to cover up the instrument panel and other parts of the interior linings of a vehicle with a covering material, for example with a visible covering of real leather or imitation leather, plastic films, skins, and the like. This covering material stretches over both the support component and the top cover.

In order to ensure perfect functioning of the airbag arrangement and particularly a specified tearing open of the top cover, it is customary in prior art to provide the covering material with a tear line or tear seams in the area of the predetermined breakage points. Leather covers assembled from a plurality of parts, for example, are known for this from prior art, which are sewn together in the area of the predetermined breakage points of the cover. The stitch length, the strength, and the material of the thread are chosen depending on the desired tear force, whereupon the seam tears at a precisely defined tear force, and the perfect deployment of the impact cushion is ensured.

Furthermore, it is known from prior art to weaken the covering material and to provide a reduction in the material thickness of the covering material in the area of the predetermined breakage points. For example, it was proposed to provide a covering material of leather, imitation leather, or plastic film, in which a partial reduction of the material thickness of the covering material is made by cutting off material in the area of the predetermined breakage points. For further clarification of prior art, reference is made to the publications DE 195 16 230 C2, DE 10 2006 054 590 B3, EP 0 428 935 B1, and EP 0 741 062 B1.

These solutions from prior art require treatment and/or adaptation of the covering material in order to reduce the tear strength of the covering material in the area of the predetermined breakage points and to achieve a specified tearing open of the covering material upon the loosening of the top cover from the support component. Furthermore, it is necessary to so position the covering material precisely over the support component that the weakening sites lie in the area of the predetermined breakage points.

Documents DE 197 38493 A1 and U.S. Pat. No. 6,942,243 B2 show airbag covers that exhibit a sort of cutting knife running around at their edge, which projects from the airbag cover upward in the direction of the covering material and cuts into the covering material upon triggering the airbag. U.S. Pat. No. 5,466,000 shows an airbag cover with a cutting edge, wherein the entire edge of the airbag cover exhibits serrations that project upward at an angle of 90° from the airbag cover and cut into the covering material. U.S. Pat. No. 5,375,875 shows an airbag cover with individual cutting points that likewise stick upward from the airbag cover in order to cut into the covering material.

The last airbag cover to be described therefore exhibits separate cutting aids, which project from the cover upward at an angle in the direction of the covering material. These cutting aids require an additional manufacturing cut and have the risk of injury if a passenger hits his head or another part of his body against the airbag cover. The cutting aids would punch into the passenger's forehead upon impact with the head.

The patent EP 2 233 372 A1 provides, at the edge of the cover, for at least one serration to be formed, which extends from the edge of the top-cover component into its plane and which tears the covering material off the support component upon the loosening of the top-cover component. This at least one serration cuts cleanly along a predetermined breakage line, which is formed between the top cover and the support component. The patent EP 2 233 372 A1 consequently creates a cutting aid for which no other component or separate production step is necessary, but in the construction of the predetermined breakage line or tear-off seam between the support component and the top-cover component, these cutting aids arise more or less as a "by-product". The serration or serrations are oriented in the direction of the plane of the support and do not project in the direction of the covering material that is to be torn off As a result, injuries from the cutting aids being provided can be avoided. According to EP 2 233 372 A1, the serrations will specifically tear the covering material upon the loosening of the top-cover component from the support component, without the covering material having to show structural weakening in the area of the predetermined breakage line.

A similar release is described in the patent DE 103 44 401 A1. This work discloses an airbag cover with a support layer that is weakened in the area of the opening, so that the support layer opens along the weakening in a specified manner upon the triggering of the airbag. The weakening of the support layer is so designed that upon the opening of the airbag cover, serrations in the support layer sever the decorative layer, in which the decorative layer is not weakened in the area of the opening.

Starting from the prior art discussed above, one task of the invention is to disclose an airbag cover, whose tear behavior is further optimized upon release of the airbag.

This problem is solved by means of an airbag cover according to claim 1, as well as by a method for manufacturing an airbag cover according to claim 14. Particular embodiments are disclosed in the dependent claims.

The invention provides an airbag cover, in particular for use in an airbag arrangement of a motor vehicle, with a support component and a top-cover component disposed on the support component, which in its closed position covers a receptacle for an airbag impact-site and upon the triggering of the airbag is at least partially loosened from the support component and releases the receptacle. The support component and top-cover component are covered up with a covering material. A predetermined breakage line is formed between the support component and the top-cover component, which defines at least one serration or an undulation at the edge of the top-cover component to tear the covering material upon the loosening of the top-cover component from the support component. According to the invention, the covering material exhibits a structural weakening, the contour of which is congruent with the contour of the predetermined breakage line in the area of the serration or of the undulation. In the preferred embodiment of the invention, the breakage line between the support component and the top-cover component and the structural weakening of the covering material are extensively or entirely congruent. The predetermined breakage line between the support component and the top-cover component and the structural weakening of the covering material are mutually formed by one or a plurality of cuts, wherein the cuts fully sever the support component in the direction of its thickness and partially sever the covering material.

Basically, the support component and the top-cover component in the invention can be shaped like that in EP 2 233 372 A1. Additionally, the covering material exhibits a structural weakening, in order to achieve a specified ripping of the covering material at a reduced tear force and elasticity of the covering layer. Unlike in prior art, the structural weakening of the covering layer does not have to be performed ahead of time and then be positioned relative to the predetermined breakage line on the support component, but the invention provides for manufacturing the breakage line and the structural weakening of the covering material in one and the same work process by means of cutting. At the same time, the cut or cuts sever the support component completely in the direction of its thickness, while they only partially penetrate into the covering material. The expense of manufacturing the airbag cover according to the invention is no greater than the expense to manufacture an airbag cover without structural weakening of the covering material, wherein it is especially advantageous that the structural weakening of the covering material does not have to be positioned relative to the predetermined breakage line of the support, since this adjustment is both expensive and full of flaws.

The invention creates an airbag cover that tears off with reduced stretching of the covering layer and correspondingly lower tear force than in prior art.

In an especially preferred embodiment of the invention, the cut or cuts for forming the predetermined breakage line run between support component and top-cover component and the structural weakening of the covering material diagonal to a surface of the covering material, therefore at an angle different from 90°. Preferably, a cutting surface is formed by the cut or cuts, which includes an acute angle with the underside of the top-cover component, particularly an angle between 30° and 90°, especially an angle between 45° and 90°, and, especially preferred, an angle between 60° and 70°. As a result, serrations or undulations are formed at the edge of the top-cover component with diagonal cutting edges, which cut into the covering material upon the triggering of the airbag, and at predetermined points one or a plurality of initial tears develop, which lead to a specified tearing off of the covering material. Surprisingly, it has resulted that the diagonal cutting surfaces at the edge of the top-cover component not only improve the tear behavior of the airbag cover upon triggering of the airbag, but the weakening line in the covering material here is also no longer discernible at all from the visible side of the covering material or at any rate is clearly less discernible than in prior art.

The covering material is preferably formed with a foam layer and an elastic decorative layer, wherein the invention provides that the covering material here is to be cut into from the underside in the direction of its thickness such that the foam layer is completely severed or torn and the decorative layer is partially severed or torn. The cut or cuts can, for example, penetrate into the decorative layer in the direction of its thickness to approximately 85% to 98% of the thickness of the decorative layer, and preferably to approximately 90% to 95% of the thickness of the decorative layer. This is a greater weakening than is customary in prior art, wherein according to the invention the weakening line here is nevertheless not, or almost not, visible from the surface of the covering material. It is presumed that it is to be attributed to the combination of the diagonal cut direction and the undulation- or serration-shaped cutting guide.

In the preferred embodiment of the invention, the predetermined breakage line between the support component and the top-cover component and the structural weakening of the covering material exhibits not simply just one serration or undulation. In a first embodiment, above one section of the breakage line and of the structural weakening, a plurality of essentially triangular or trapezoidal projections is provided depending on the type of serration row, in order to form a severing structure. In another embodiment, a section of the breakage line and the structural weakening is shaped in the form of an undulating, sinusoidal, or modified sinusoidal cut to form the severing structure. The severing structure can, for example, exhibit three to five projections or undulations at the edge of the top-cover component.

In one embodiment of the invention, the top-cover component and the support component are connected at an edge above a hinge element, wherein the severing structure is formed in the area of the edge of the top-cover component facing the hinge element. The cuts for manufacturing the predetermined breakage line and the structural weakening of the covering material can, for example, be made by a laser cutter or by waterjet cutting. This results according to the invention in a single cutting process through the material of the support component and a part of the covering material. The predetermined breakage line and weakening structure can be formed by means of a continuous cut or a series of individual cuts.

For example, it can be provided that the predetermined breakage line and the structural weakening in the area of the severing structure are formed by a continuous cut line, while in the remaining part of the breakage line, a series of individual cuts is provided. It is also possible to vary the length and the interval of the cuts as well as the cut depth along the breakage line in order to control the ripping behavior of the top-cover component. For example, in the area of the severing structure, a denser sequence of the cuts or longer cuts are provided, while in the remaining area of the breakage line, fewer and shorter cuts are provided.

In an embodiment example of the invention, the covering material exhibits a foam layer of a thermoplastic polymer, for instance polyurethane, polyolefin, or polyvinyl chloride (PVC). The foam layer can also be made of three-dimensional fabric. Examples of the elastic decorative layer are leather, imitation leather, PVC for example, or a thermoplastic polymer such as thermoplastic urethane (TPU), from fabric and a skin or film of a thermoplastic polymer such as PVC, thermoplastic olefin (TPO), TPU, or an acrylonitrile butadiene styrene (ABS)/PVC mixture. According to the invention, combinations of the foams and decorative layers cited can also be used to form the covering material.

The serrations or undulations can basically be any shape for forming the severing structure suitable for producing initial tears in the covering material, when tearing off the top-cover component along the breakage line and the structural weakening, leading to a specific ripping of the covering material. Different, variously shaped serrations or undulations can also be provided. The severing structure is not limited to a specific shape, number, or arrangement of the serrations or undulations. The predetermined breakage line should be so designed that the points of the serrations or undulations are completely uncovered.

The number, arrangement, and shape of the serrations or undulations depend on the desired tear behavior, size, and shape of the top-cover component, as well as on the materials selected and material strength of the support component and top-cover component as well as of the covering material.

The support component and top-cover component can be manufactured in a known manner as an injection-molded part made of plastic or as a press-molded part made of a fiber material or something else.

The invention also provides a method for manufacturing the airbag cover. Here the covering material is first applied to the support material. Subsequently, the predetermined breakage line is formed in the support component such that at least one serration or an undulation cuts cleanly at the edge of the top-cover component. The breakage line is formed by one or a plurality of cuts that fully penetrate the support component in the direction of its thickness and partially penetrate the covering material, to simultaneously produce a structural weakening of the covering material, the contour of which is precisely congruent with the contour of the breakage line at least in the area of the serration or the undulation. According to the invention, therefore, the predetermined breakage line separating the top-cover component from the support component is formed in a single cutting process, along with the weakening structure in the covering material being made congruent to the breakage line as well. Preferably, the breakage line and weakening structure are entirely or extensively congruent.

The cut or cuts are designed as described above for forming the breakage line and weakening structure, preferably at an angle other than 90° to the surface of the covering material. The cut direction preferably occurs at an acute angle relative to the underside of the top-cover component, as explained above. The above embodiments for the airbag cover accordingly apply to the method. Examples of airbag-cover treatment for forming the breakage line and the structural weakening of the covering material are laser cutting and waterjet cutting.

The invention is clarified in detail in the following using preferred embodiment examples with reference to the drawings.

FIG. 1 shows an isometric representation of an instrument panel with an airbag arrangement according to the invention;

FIG. 2 shows a sectional representation through the instrument panel of FIG. 1 along line A-A, wherein the cut passes through the airbag cover according to the invention;

FIG. 3 shows a detail view (Detail B) of the sectional representation of FIG. 2;

FIG. 4 shows a schematic perspective representation of an embodiment example of a top-cover component during the opening of the airbag cover according to the invention;

FIGS. 6A and 6B show a schematic plan view and a perspective representation of the top-cover component of an airbag arrangement to explain the path of the predetermined breakage line according to an embodiment example of the invention;

FIGS. 7A and 7B show a schematic plan view and a perspective representation of the top-cover component of an airbag arrangement to explain the path of the predetermined breakage line according to a further embodiment example of the invention;

FIGS. 8A and 8B show a schematic plan view and a perspective representation of the top-cover component of an airbag arrangement to explain the path of the predetermined breakage line according to a still further embodiment example of the invention.

Figure 5:
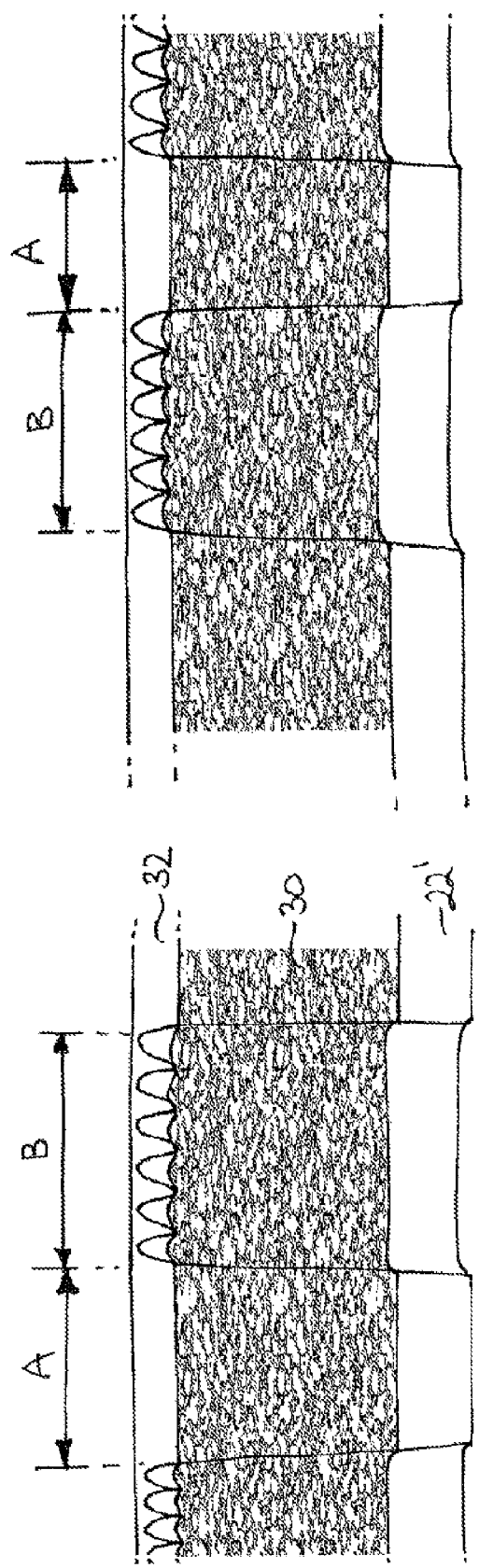
FIG. 5 shows a detailed view of the outer edge of the top-cover component of FIG. 4 after opening the top-cover component.

FIG. 1 shows an isometric representation of an instrument panel 10 of a motor vehicle with an area for display instruments 12 on the driver's side and an area for an airbag 14 as forward-impact protection on the passenger side. The area for the airbag 14 exhibits a receptacle for the airbag impact-cushion, operating equipment for the airbag, and a cover for the receptacle, which are not shown individually in FIG. 1. The attachment of a receptacle for an airbag impact-cushion and the related operating equipment below the instrument panel are basically known from prior art and are shown, for example, in the following publications: DE 298 11 739 U1, DE 100 32 104 A1, DE 102 53 185 A1, and DE 2006 008 564 A1. The instrument panel is, as a rule, built with a single- or multiple-part support component 24, which the contour of the instrument panel 10 prescribes and into which the various display and control units as well as an airbag module can be integrated. The airbag module consists of the airbag impact-cushion as well as operating equipment, for example a hot- or cold-gas generator, an acceleration sensor, a triggering unit, etc. The receptacle for the airbag impact-cushion is disposed underneath area 14 and is covered by a top-cover component 22. The top-cover component 22 and the support component 24 are made as an integral shaped part in the preferred embodiment of the invention, for example by means of injection molding of plastic or shaping a plate material or press-forming a fiber or plastic material.

The shaped part that forms the support component 24 and the top-cover component 22 can be made of a natural fiber or a plastic and can basically be made of a thermoplastic or Duroplast or a combination of a thermoplastic and Duroplast, as well as fiber.

During the manufacture of this shaped part or in a subsequent procedural step, a predetermined breakage line 26 is formed between the top-cover component 22 and the support component 24, which ensures a specified ripping of the top-cover component 22 upon the triggering of the airbag impact-cushion below the top-cover component 22. The breakage line can, for instance, be formed by laser cutting or waterjet cutting. This is described in the following with further particulars.

In FIG. 1 a steering wheel 16, a center console 18, and a gearshift lever 20 are schematically further indicated.

As shown in FIGS. 2 and 3, the support component 24 of the instrument panel and the top-cover component 22 are covered up with a covering material 28, which in the embodiment shown is made in two layers, with a soft foam layer 30 and a decorative layer 32. The foam layer 30 can, for example, contain a polyurethane (PU) foam, polyolefin, polyvinyl chloride (PVC), or even a three-dimensional fabric, and the decorative layer 32 can be made of a leather, imitation leather, a plastic film, a slush skin, or the like. Possible materials for the elastic decorative layer are PVC, TPO, TPU, or an ABS/PVC mixture, wherein the invention is not limited thereto. The covering material 30 is bonded, for example, to the support component 24 and the top-cover component 22.

The top-cover component 22 is separated from the support component 24 by the predetermined breakage line 26, wherein the covering material 28 exhibits a structural weakening 26' in the area of the breakage line 26, which is congruent with the breakage line 26. The breakage line 26 is so formed that the top-cover part 22 is permanently connected to the support component 24 by means of a hinge area 34. This hinge area 34 can be formed in a simple manner by means of a seamless transition from the top-cover component 22 to the support component 24 or by including a film hinge, which is formed by a reduction in the thickness of the material between one long edge of the top-cover component 22 and the support component 24. A hinge can be based on an embedded fabric tape or another type of hinge, which allows the top-cover component 22 to burst open upon the triggering of the airbag.

The predetermined breakage line 26 and the structural weakening 26' are formed between the top-cover component 22 and the support component 24 at the long edge 36 facing the hinge area as well as on the two side edges 38, 40 so that the edge of the top-cover component 22 exhibits serrations and/or undulations, which tear into the covering material 38 over the top-cover component upon the loosening of the top-cover component 22 from the support component 24. The serrations and/or undulations should preferably be formed at the long edge 36 of the top-cover component 22 facing the hinge area 34 and particularly in the middle of the long edge 36 and/or in the area of the two corners 46, 48 bounding the long edge 36. Optionally, serrations and/or undulations can also be formed at the side edges 38, 40 of the top-cover component 22.

According to the invention, the predetermined breakage line 26 and the structural weakening 26', which separate the top-cover component 22 from the support component 24, are aligned and are consequently congruent over at least one part, preferably over the entire length, of the breakage line 26. The breakage line 26 in the support component and the structural weakening 26' in the covering material are formed by an integrated cutting process, in which a continuous or broken cut-line or a perforation is made through the material of the support 24 and a part of the covering material 38. The cut surface thus formed extends diagonally to the surface of the covering material, as shown in FIGS. 2 and 3. As is further explained with reference to FIG. 4, the cut surface preferably makes an acute angle with the underside of the top-cover component 22, in particular an angle between 30° and 90°, more specifically between 45 and 90°, and, especially preferred, between 60 and 80°, for example an angle of approximately 70°. As a result, diagonal serrations or undulations are formed at the side edge of the top-cover component, which achieve a precise cut into the covering material of the top-cover component and consequently a specified tear of the covering material upon triggering of the airbag.

In the preferred embodiment of the invention, the cut depth for forming the predetermined breakage line 26 and the structural weakening 26' are chosen such that the cut completely severs the support material 24 as well as the foam layer 30 of the covering material and penetrates into the decorative layer 32 approximately 85 to 98%, preferably approximately 90 to 95%, looking toward the thickness.

An advantageous embodiment of the airbag cover according to the invention is represented in FIG. 4. In this embodiment, the predetermined breakage line 26 along the edge facing the hinge area 34 of the top-cover component 22 is made undulatory, wherein four undulations 52 are provided in the embodiment shown. In FIG. 4, the construction of the top-cover component 22 is also readily recognizable, with a support 22' of the top-cover component 22 as well as the foam layer 30 and the decorative layer 32 of the covering material 28. The acute angle α formed between the underside of the top-cover component 22 and the cut surface 54 forming the side edge of the top-cover component is represented in the cutaway enlargement in FIG. 4.

FIG. 5 shows a cutaway enlargement of the side edge of the top-cover component formed by the cut surface 54 after the loosening of the top cover from the support component. In the embodiment shown, the predetermined breakage line and the structural weakening of the covering material are formed by a broken laser-cut weakening, with the unweakened area A and weakened area B. In the figure, it may be perceived that the respective partial cuts pass completely through the support material 22' and the foam layer 30, whereas the individual cuts do not fully penetrate the decorative layer 32. In practice, the breakage line 26 and structural weakening 26' can also be achieved by means of a plurality of perforations. It should be noted that the representation of size and thickness ratios in FIG. 5 and the other figures are merely schematic and by way of example and that the invention is not limited thereto.

Surprisingly, it has been shown with the invention that not only the tear behavior of the airbag arrangement according to the invention is superior to prior art, since a precise ripping of the covering layer can be achieved with reduced tear force and stretching of the covering layer, but also since, in spite of the greater penetration depth of the structural weakening into the covering material, the structural weakening here is not, or almost not, visually and tactilely perceptible from the upper side of the covering material.

FIGS. 6A, 6B, 7A, 7B, 8A, and 8B show in plan view as well as in a perspective representation three different embodiments for the contour of the predetermined breakage line of the airbag arrangement according to the invention. In the embodiment of FIGS. 6A and 6B, the top-cover component 22 exhibits five serrations 42 at its side edge facing the hinge area 34. The serrations 42 are formed as triangular projections; however they could also be trapezoidal, parabolic or hyperbolic, bifurcated, or otherwise shaped.

In the embodiment of FIGS. 7A and 7B, five undulations 52 are formed at the edge of the top-cover component 22 facing the hinge area 34 and in the embodiment of FIGS. 8A and 8B, four undulations 52 are formed at the corresponding side edges. It is also possible to provide a corrugation in the area of the predetermined breakage line of the top-cover component, according to the type of undulation cut, as well as a combination of undulations and serrations.

Naturally, the invention is not limited to the arrangement of the serrations 42 and undulations 52 shown, and a larger or smaller number of undulations and/or serrations can be provided in the area of the side edges and corners of the top-cover component.

Figure 9:
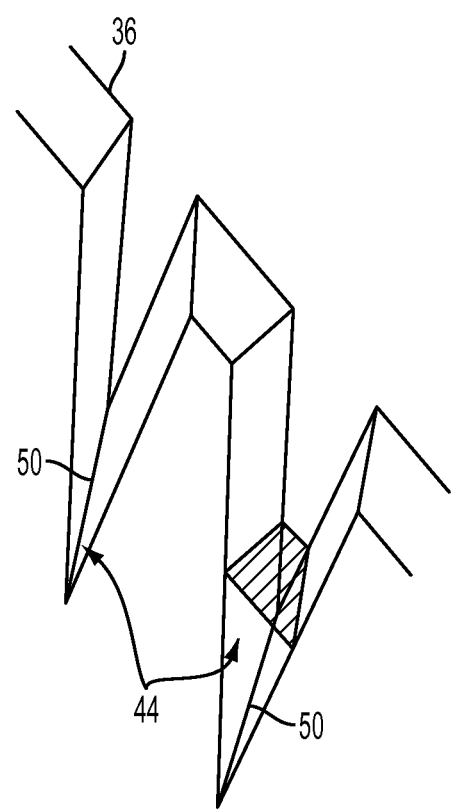
FIG. 9 shows a detail representation for a possible shape of the serrations that are formed at the outer edge of the top-cover component.

In all the embodiments of the invention, the predetermined breakage line and the structural weakening are made diagonal to the surface of the decorative material, at least in the area of the undulations and serrations, as represented in FIGS. 4 and 9.

FIG. 9 shows schematically a perspective representation of the cut surface along the outer edge of the top-cover component, wherein the layered construction, with support material, foam layer, and decorative layer, is not depicted individually. In the embodiment of FIG. 9, the edge of the top-cover component is provided with serrations 44, the cutting edges of which make an acute angle with the underside of the top-cover component. As a result, the side surfaces of the serrations slant, so that a trapezoidal cross-section of the serrations results, as is indicated in FIG. 9 by the shading. A similar structure results with an edge designed to be undulatory.

In the preferred embodiment of the invention, the airbag cover is made such that the covering material is applied to the support component, for example bonded to it. The predetermined breakage line in the support component and the structural weakening in the covering material are subsequently formed by means of laser cutting or waterjet cutting, wherein this breakage line separates the top-cover component. To form the diagonal side edges, the cutting tool, for instance the laserjet or waterjet, is directed at a diagonal to the surface of the shaped part.

Whereas the predetermined breakage line and the structural weakening are represented, for example in FIGS. 6A, 7A, and 8A, as continuous lines, in practice they consist, as a rule, of a series of individual cuts or perforations at a distance from one another, wherein according to the invention one serration or one undulation each is cut partially or completely free. The distance of the individual cut or perforation point depends on the size of the top-cover component, the materials used, and the material strengths. In just the same way, the precise shape, number, and arrangement of the serrations and/or undulations depends on the dimensions of the top-cover component, the materials used, and the material strengths, as well as the desired trigger sensitivity of the airbag cover.

The features disclosed in the description, figures, and claims being provided can be significant both individually and in any desired combination for the implementation of the invention in its various embodiments.

Reference List
10 Instrument panel
12 Area for display instruments
14 Area for airbag
16 Steering wheel
18 Central console
20 Gearshift lever
22 Top-cover component
22' Support material for top-cover component
24 Support component
26 Predetermined breakage line
26' Structural weakening
28 Covering material
30 Foam layer
32 Decorative layer
34 Hinge area
36 Long edge
38, 40 Side edges
42, 44 Serrations
46, 48 Corners
50 Cutting edges
52 Undulations
54 Cut surface
α Acute angle

What is claimed is:

1. An airbag cover for use in an airbag arrangement of a motor vehicle, with a support component and a top-cover component disposed on the support component that is configured for this, to cover a receptacle for an airbag impact-cushion in a closed position and to be at least partially loosened from the support component upon triggering of the airbag and the receptacle is opened, wherein the support component and the top-cover component are covered up with a covering material, in which a predetermined breakage line is formed between the support component and the top-cover component, which defines at least one serration or one undulation at the edge of the top-cover component, and the covering material exhibits a structural weakening, characterized in that the contour of the structural weakening is congruent with the contour of the breakage line at least in the area of the serration or the undulation, wherein the breakage line between the support component and the top-cover component and the structural weakening of the covering material are formed in the area of the serration or the undulation by one or a plurality of cuts that fully penetrate the support component and partially penetrate the covering material; and wherein the cut or cuts are formed at an angle to the surface of the covering material that is different from 90 degrees.

2. The airbag cover according to claim 1, wherein the predetermined breakage line between the support component and the top-cover component and the structural weakening of the covering material are entirely congruent.

3. The airbag cover according to claim 1, wherein the serration or the undulation at the edge of the top-cover component extends into the plane of the top-cover component from the edge of the top-cover component.

4. The airbag cover according to claim 1, wherein the cut or cuts form a cut surface which makes an acute angle with the underside of the top-cover component.

5. The airbag cover according to claim 1, wherein the covering material exhibits a foam layer and an elastic decorative layer and in which the cut or cuts fully penetrate the foam layer and partially penetrate the decorative layer.

6. The airbag cover according to claim 5, wherein the cut or cuts penetrate the decorative layer in a direction toward its thickness, to approximately 85 to 98% of the thickness of the decorative layer.

7. The airbag cover according to claim 1, wherein the predetermined breakage line between the support component and the top-cover component and the structural weakening of the covering material has at least in sections the shape of a plurality of essentially triangular or trapezoidal projections, in order to form a severing structure.

8. The airbag cover according to claim 1, wherein the predetermined breakage line between the support component and the top-cover component and the structural weakening of the covering material has at least in sections the shape of an undulatory cut, a sine wave, or a modified sine wave, in order to form a severing structure.

9. The airbag cover according to claim 7, wherein the severing structure exhibits three to five projections or undulations at the edge of the top-cover component.

10. The airbag cover according to claim 7, wherein the top-cover component is connected to the support component at an edge above a hinge element and in which the severing structure is formed in the area of the edge of the top-cover component facing the hinge element.

11. The airbag cover according to claim 1, wherein the predetermined breakage line between the support component and the top-cover component and the structural weakening of the covering material are made by laser cutting or waterjet cutting in an integrated work procedure.

12. The airbag cover according to claim 1, wherein the covering material exhibits:
- a foam layer made of a thermoplastic polymer, or a three-dimensional fabric; and
- a decorative layer of leather, or of imitation leather on the foam or fabric, or of a skin or film of a thermoplastic polymer; or
- a combination of the foams and decorative layers cited.

13. A method for manufacturing an airbag cover for use in an airbag arrangement of a motor vehicle, with the following procedural steps: applying a covering material to a support component, and forming a predetermined breakage line in the support component, wherein the breakage line defines a top-cover component in the support component that is configured for this, to cover a receptacle for an airbag impact-cushion in a closed position and to be at least partially loosened from the support component upon triggering of the airbag and the receptacle is opened, wherein the predetermined breakage line cleanly cuts at least one serration or one undulation at the edge of the top-cover component, and in which the breakage line is formed by one or a plurality of cuts, which fully penetrate the support component in a direction toward its thickness and partially penetrate the covering material, in order to produce a structural weakening of the covering material, the contour of which is congruent with the contour of the breakage line at least in the area of the serration or of the undulation; and wherein the cut or cuts are formed at an angle to the surface of the covering material that is different from 90 degrees.

14. The airbag cover according to claim 13, wherein the predetermined breakage line between the support component and the top-cover component and the structural weakening of the covering material are made by laser cutting or waterjet cutting in an integrated cutting process.

\* \* \* \* \*